Figure 1:
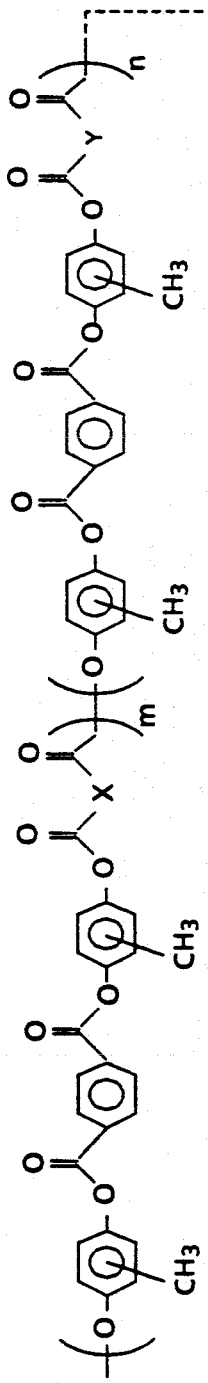

United States Patent [19]

Sacripante et al.

[11] Patent Number: 5,082,919
[45] Date of Patent: Jan. 21, 1992

[54] CROSSLINKED THERMOTROPIC LIQUID CRYSTALLING POLYARYLATE

[75] Inventors: Guerino Sacripante, Cambridge; T. Brian McAneney, Burlington; Stephan Drappel, Toronto; Sheau Van Kao, Oakville; Lupu Alexandru, Toronto, all of Canada

[73] Assignee: Xerox Corporation, Stamford, Conn.

[21] Appl. No.: 561,642

[22] Filed: Jul. 30, 1990

Related U.S. Application Data

[62] Division of Ser. No. 315,664, Feb. 27, 1989, Pat. No. 4,973,539.

[51] Int. Cl.$^5$ .................. C08G 63/00; C08G 67/00
[52] U.S. Cl. .................................. 528/176; 528/182; 528/194

[58] Field of Search ............... 528/176, 271, 182, 194; 430/109

[56] References Cited

U.S. PATENT DOCUMENTS

| | | | |
|---|---|---|---|
| 3,590,000 | 6/1971 | Palermiti et al. | 524/601 |
| 4,233,387 | 11/1980 | Mammino et al. | 430/137 |
| 4,293,627 | 10/1986 | Murphy et al. | 430/39 |
| 4,394,498 | 7/1983 | Kastelic | 528/193 |
| 4,543,313 | 9/1985 | Mahabadi et al. | 430/109 |
| 4,588,668 | 5/1986 | Yasuda et al. | 430/109 |

Primary Examiner—Harold D. Anderson
Assistant Examiner—T. Mosley
Attorney, Agent, or Firm—E. O. Palazzo

[57] ABSTRACT

A toner composition comprised of a crosslinked thermotropic liquid crystalline polymer, a branched liquid crystalline polymer, or mixtures thereof.

19 Claims, 1 Drawing Sheet

CROSSLINKED THERMOTROPIC LIQUID CRYSTALLING POLYARYLATE

This is a division of application Ser. No. 315,664, filed Feb. 27, 1989, now U.S. Pat. No. 4,973,539.

BACKGROUND OF THE INVENTION

This invention is generally directed to toner compositions, and more specifically, the present invention relates to toner and developer compositions comprised of novel crosslinked thermotropic crystalline components. More specifically, in one embodiment of the present invention there are provided developer compositions formulated by admixing toner compositions containing crosslinked, or branched thermotropic liquid crystalline polymers, and carrier components. In one specific embodiment of the present invention, there are provided low melting toner compositions with the thermotropic liquid crystalline polymers as illustrated in U.S. Pat. No. 4,543,313, the disclosure of which is totally incorporated herein by reference, which polymers have been crosslinked, or are branched as indicated herein. The toner compositions of the present invention possess a number of advantages including enablement of their melting over a narrow temperature interval wherein there is a substantial decrease in the melt viscosity, which is above the melting temperature of many known toner resins, excellent flow properties, and low fusing temperatures such as, for example, 129° C. thereby enabling less fusing energy and prolonging the fuser life. Specifically, the toner compositions of the present invention possess low fusing temperatures, and therefore lower fusing energies are required for fixing thus enabling less power consumption during fusing, and permitting extended lifetimes for the fuser systems selected. Accordingly, thus the toners of the present invention can be fused (fuser roll set temperature) at temperatures of 275° F. and as low as 225° F. as compared to many currently commercially available toners, which fuse at temperatures of from about 300° F. to about 325° F. Furthermore, the toner compositions of this invention possess a broad fusing lattitude of above 30° C. and as high as 60° C. or more, which inhibits the toner from offsetting onto the fused rollers usually associated with ghosting or background images on subsequent copies. Also, the toner compositions of the present invention possess acceptable blocking characteristics at, for example, above 55° C., thereby avoiding, or substantially minimizing agglomerate during manufacturing, transportation or storage. Moreover, the toner and developer compositions of the present invention are particularly useful in electrophotographic imaging and printing systems, especially xerographic imaging and printing processes.

The electrostatographic process, and particularly the xerographic process, is well known. This process involves the formation of an electrostatic latent image on a photoreceptor, followed by development, and subsequent transfer of the image to a suitable substrate. Numerous different types of xerographic imaging processes are known wherein, for example, insulative developer particles or conductive toner compositions are selected depending on the development systems used. Moreover, of importance with respect to the aforementioned developer compositions are the appropriate triboelectric charging values associated therewith, as it is these values that enable continued constant developed images of high quality and excellent resolution, and admixing characteristics. Specifically, thus toner and developer compositions are known, wherein there are selected as the toner resin styrene acrylates, styrene methacrylates, and certain styrene butadienes, including those available as Pliolites. Other resins have also been selected for incorporation into toner compositions inclusive of the polyesters as illustrated in U.S. Pat. No. 3,590,000. Additionally, it is known that single component magnetic toners can be formulated with styrene butadiene resins, particularly those resins available as Pliolite. In addition, positively charged toner compositions containing various resins, inclusive of certain styrene butadienes and charge enhancing additives, are known. For example, there are described in U.S. Pat. No. 4,560,635, the disclosure of which is totally incorporated herein by reference, positively charged toner compositions with distearyl dimethyl ammonium methyl sulfate charge enhancing additives.

Numerous patents are in existance that illustrate toner compositions with various types of toner resins including, for example, U.S. Pat. Nos. 4,104,066, polycaprolactones; 3,547,822, polyesters; 4,049,447, polyesters; 4,007,293, polyvinyl pyridine-polyurethane; 3,967,962, polyhexamethylene sebaccate; 4,314,931, polymethyl methacrylates; Re. 25,136, polystyrenes; crosslinked toner resins, reference U.S. Pat. No. 3,938,992, Re. 31,071; 4,469,770, styrene butadienes; thermotropic liquid crystalline polycarbonates, copolycarbonates, polyurethanes, polyesters, and copolyesters, reference U.S. Pat. No. 4,543,313, the disclosure of which is totally incorporated herein by reference; and U.S. Pat. No. 4,891,293, the disclosure of which is totally incorporated herein by reference. The thermotropic liquid crystalline polymers of the present invention are similar in some embodiments to those as illustrated in the aforementioned '313 patent and '293 patent with the important exceptions that the polymers of the present invention are crosslinked, branched, or comprised of a mixture of crosslinked and branched polymers. This enables advantages such as toners exhibiting low melt or low fixing temperatures of, for example, from about 105° to 140° C. while maintaining a broad fusing latitude of from about 20° to 45° C. and acceptable blocking temperature of above 55° C.

Also, there is described in U.S. Pat. No. 4,529,680 magnetic toners for pressure fixation wherein the melting point of the polymer is, for example, from 150° to 240° C., and preferably 180° to 230° C. Other patents of background interest include U.S. Pat. Nos. 3,720,617; 3,752,666; 3,788,994; 3,983,045; 4,051,077; 4,108,653; 4,258,116 and 4,558,108.

In addition, several recently issued patents illustrate toner resins including vinyl polymers, diolefins, and the like, reference for example U.S. Pat. No. 4,560,635. Moreover, there are illustrated in U.S. Pat. No. 4,469,770 toner and developer compositions wherein there is incorporated into the toner styrene butadiene resins prepared by emulsion polymerization processes.

As a result of a patentability search, there were selected U.S. Pat. Nos. 4,543,313, mentioned herein; 4,394,498, which discloses particulate thermotropic liquid crystalline polymers; 4,293,627 and 4,588,668, which illustrate the inclusion of polycarboxylic acids and dicarboxylic acids/diopolyester polymerizations for toners; and as background interest 3,272,644; 4,702,945 and 4,713,196.

Furthermore, a number of different carrier particles have been illustrated in the prior art, reference for example the U.S. Pat. No. 3,590,000 mentioned herein; and U.S. Pat. No. 4,233,387, the disclosures of which are totally incorporated herein by reference, wherein coated carrier components for developer mixtures, which are comprised of finely divided toner particles clinging to the surface of the carrier particles, are recited.

Although the above described toner compositions and resins are suitable for their intended purposes, in most instances there continues to be a need for toner and developer compositions containing new resins. More specifically, there is a need for toners which can be fused at lower energies than many of the presently available resins selected for toners. There is also a need for resins that can be selected for toner compositions which are of low cost, nontoxic, nonblocking at temperatures of less than 50° C., jettable, melt fusible with a broad fusing latitude, cohesive above the melting temperature, and triboelectrically chargeable. In addition, there remains a need for toner compositions which can be fused at low temperatures, that is for example 129° C. or less, as compared to many toners presently in commercial use, which require fusing temperatures of about 300° to 325° F., thereby enabling with the compositions of the present invention the utilization of lower fusing temperatures, and lower fusing energies permitting less power consumption during fusing, and allowing the fuser system, particularly the fuser roll selected, to possess extended lifetimes. Another need resides in the provision of developer compositions comprised of the toner compositions illustrated herein, and carrier particles. There also remains a need for toner and developer compositions containing additives therein, for example charge enhancing components, thereby providing positively, or negatively charged toner compositions. Furthermore, there is a need for toner and developer compositions with crosslinked thermotropic liquid crystalline polymers that will enable the generation of solid image areas with substantially no background deposits, and full gray scale production of half tone images in electrophotographic imaging and printing systems. The aforementioned toner and developer compositions can be selected for electrophotographic imaging and printing systems, especially xerographic processes, and wherein, for example, contact or noncontact fusing can be accomplished such as by flash, radiant, with heated ovens, steam, and the like.

SUMMARY OF THE INVENTION

It is an object of the present invention to provide toner and developer compositions which possess many of the advantages illustrated herein.

In another object of the present invention there are provided developer compositions with positively, or negatively charged toners comprised of crosslinked thermotropic liquid crystalline polymers.

Also, in another object of the present invention there are provided toner compositions comprised of, or containing therein a crosslinked thermotropic liquid crystalline polymer.

Further, in another object of the present invention there are provided toner compositions comprised of a branched thermotropic liquid crystalline polymer.

Additionally, in another object of the present invention there are provided toner compositions comprised of, or containing therein a mixture of a branched thermotropic liquid crystalline polymer, and a crosslinked thermotropic liquid crystalline polymer.

Moreover, in another object of the present invention there are provided low melting toner compositions.

Further, in an additional object of the present invention there are provided developer compositions comprised of toners comprised of the liquid crystalline polymers illustrated herein, and carrier particles.

Furthermore, in another object of the present invention there are provided improved toner compositions which can be fused at low temperatures thereby reducing the amount of energy needed for affecting fusing of the image developed.

Moreover, in another object of the present invention there are provided developers with positively charged toner compositions that possess excellent electrical properties.

Also, in another object of the present invention there are provided developers with stable triboelectric charging characteristics for extended time periods exceeding, for example, 100,000 imaging cycles.

Another object of the present invention resides in the provision of toner compositions with excellent blocking temperatures, and acceptable fusing temperature latitudes.

In another object of the present invention, there are provided toner and developer compositions that are nontoxic, nonblocking at temperatures of less than 50° C., jettable, melt fusible with a broad fusing latitude, and cohesive above the melting temperature thereof.

Furthermore, in an additional object of the present invention there are provided developer compositions containing carrier particles with a coating thereover comprised of, for example, a mixture of polymers that are not in close proximity in the triboelectric series, reference U.S. Pat. Nos. 4,935,326 and 4,937,166, the disclosures of which are totally incorporated herein by reference.

Also, in yet still another object of the present invention there are provided methods for the development and generation of high quality electrostatic latent images with toner compositions comprised of the thermotropic liquid crystalline polymers illustrated herein.

In yet another object of the present invention, there are provided developer compositions with carrier components obtained by a dry coating process, which compositions possess substantially constant conductivity parameters, and a wide range of preselected triboelectric charging values.

Furthermore, in yet a further object of the present invention there are provided developer compositions with carrier particles comprised of a coating with a mixture of polymers that are not in close proximity, that is for example a mixture of polymers from different positions in the triboelectric series, and wherein the toner compositions incorporated therein possess excellent admix charging values of, for example, less than one minute, and triboelectric charges thereon of from about 15 to about 35 microcoulombs per gram.

Another object of the present invention resides in the provision of toner and developer compositions which are insensitive to humidity of from about 20 to about 80 percent, and which compositions possess superior aging characteristics enabling their utilization for a substantial number of imaging cycles with slight modification of the triboelectrical properties, and other characteristics.

Also, in another object of the present invention there are provided low melting color toner compositions.

In still another object of the present invention there are provided toner and developer compositions for affecting development of images in electrophotographic imaging apparatus, including xerographic imaging, and printing processes.

These and other objects of the present invention are accomplished by providing toner and developer compositions. More specifically, in one embodiment of the present invention there are provided toner compositions comprised of pigment particles, and crosslinked thermotropic liquid crystalline polymers, branched thermotropic liquid crystalline polymers, or mixtures thereof. The aforementioned toners possess, for example, an initial flow temperature of from about 80° to about 105° C., and preferably from about 85° to about 100° C. as determined by the known Shimadzu flowtester, reference U.S. Pat. No. 4,533,614, the disclosure of which is totally incorporated herein by reference.

More specifically, the thermotropic liquid crystalline polymers of the present invention include crosslinked and branched polycarbonates, copolycarbonates, polyurethanes, polyesters and copolyesters. The toner compositions of the present invention can be comprised in one embodiment of thermotropic liquid crystalline polymers with from about 0.05 to about 2 weight percent, and preferably from about 0.1 to about 0.5 weight percent of crosslinked component as illustrated herein.

Figure 2:
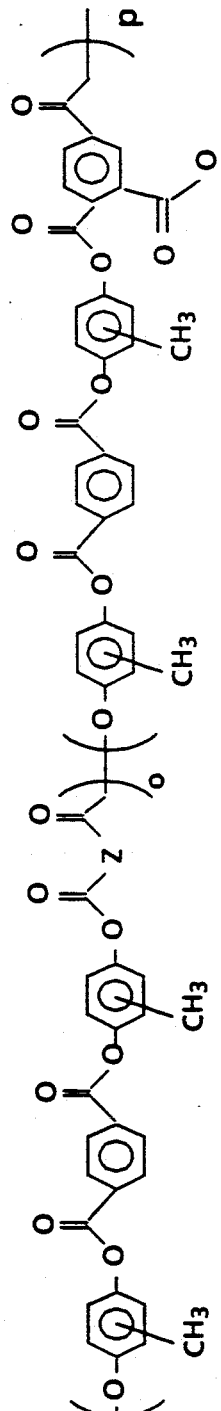

Specific thermotropic liquid crystalline polymers selected for the toner compositions of the present invention are illustrated with respect to the branched and/or crosslinked liquid crystalline random copolymers with three spacers of the formulas depicted in FIGS. 1 and 2, wherein x, y and z are independantly selected from alkyl, alkylene, substituted alkyl, and substituted alkylene subject to the provision that x, y and z represent different groups; l, m, n and o represent the number of monomer segments present in the polymer, and p represents the percentage or amount of crosslinking segment with the provision that the numerical sum of l, m, n, o and p is equal to 100.

The crosslinking component can be a trivalent acid or acid halide such as trimesic, beta-methyl tricarballic, 1,2,4 benzene tricarboxylic, 1,2,5 benzene tricarboxylic, 1,2,4 naphthalene tricarboxylic, 2,5,7 naphthalene tricarboxylic, 2,4,5 naphthalene tricarboxylic, including acid halide derivatives such as trimesoyl chloride, and the like as illustrated herein, or mixtures thereof. Furthermore, trivalent bases such as 2-hydroxy hydroquinone, resorcinol, 1,2,4 dihydroxy naphthol, 2,4,5 dihydroxy naphthol, 2,5,7 dihydroxy naphthol and their derivatives as well as mixed trifunctional acids or phenols, such as 2,4 dihydroxybenzoic acid, hydroxy terephthalic, 3-hydroxy phthalic, 4-hydroxy phthalic, 2-hydroxy isophthalic, 4-hydroxy isophthalic acids and acid halides thereof, isophthalic acid chloride, bromide and iodide can be selected as the crosslinking component. Additionally, the crosslinking agents for obtaining the thermotropic polymers of the present invention by the meltpolyesterification process include those illustrated herein, such as the alkyl ester derivatives of the above acids, with alkyls such as methyl, ethyl, propyl, butyl, pentyl, hexyl, lauryl, and mixtures thereof. Also, tetravalent or higher polyfunctional acids, bases, esters and mixture thereof such as perylene tetracarboxyl acid, halides thereof, tetraalkyl perylenate, or tartaric acid, dialkyl tartarate can be selected as the crosslinking agent.

Alkyls and alkylene groups include those with from 1 to about 25 carbon atoms, and preferably from 1 to about 10 carbon atoms such as methyl, methylene, ethyl, ethylene, propyl, propylene, butyl, butylene, hexyl, hexylene, octyl, octylene, and the like. Examples of substituents present on the alkyl or alkylene groups include, for example, alkyls as illustrated herein, such as methyl, ethyl, propyl, butyl, hexyl, lauryl and the like. Also, the sum of l, m, n, o, and p is equal to 100 percent, thus l can be from about 1 to 99 percent, m can be from about 1 to 99 percent, n can be from about 1 to 99 percent, o can be from about 1 to 99 percent and p can be from about 0.05 to 5 percent. Preferably, m, n and o are about 33 percent and p is less than 1 percent for the copolymers with the formulas as illustrated in FIG. 1, and preferably the copolymers with the formulas as illustrated in FIG. 2; l is about 50 percent, m, n, and o are about 16.1 percent, and p is less than 1 percent, and preferably p is 0.5 percent. Generally, the weight average molecular weight of the copolymers of the present invention are from about 10,000 to 150,000 and more preferably from about 9,000 to about 75,000.

The thermotropic liquid crystalline polymers of the present invention can be prepared generally by, for example, affecting crosslinking, or branching of the polymers of U.S. Pat. No. 4,543,313, the disclosure of which is totally incorporated herein by reference. More specifically, the polymers of the present invention can be prepared from a variety of mesogen and flexible spacers with or without a non-mesogenic moiety, see Kwalek et al. *The Encyclopedia of Polymer Science Eng.*, Volume 9, page 1 (1987), the disclosure of which is totally incorporated herein by reference. In one embodiment, the polymers of the present invention are prepared by crosslinking the thermotropic liquid polymers of the aforesaid '313 patent. For example, the thermotropic liquid crystalline polymers of the present invention are prepared by incorporating an effective amount, for example from about 0.05 to about 5 weight percent of crosslinking component, during the synthesis of the polymer of the '313 patent.

The random thermotropic liquid crystalline copolymers of the present invention, especially those represented by FIG. 1, are generally prepared by the copolymerization of an appropriate aromatic component such as p,p-di-(alkylaryloxy)-terephthalate with three different aliphatic diacid halides, such as adipoyl chloride, pimeloyl chloride, glutaryl chloride, sebacoyl chloride, the corresponding bromides, fluorides, iodides and the like, and a branching or crosslinking triacid halide agent such as trimesoyl chloride, and the like as illustrated herein in the presence of a base such as pyridine or triethylamine and a halogenated solvent such as dichloromethane. The random thermotropic liquid crystalline polymers of the present invention represented by FIG. 2 are generally prepared by the condensation of an aromatic diacid halide component such as terephthaloyl chloride, three different spacers, such as adipoyl chloride, pimeloyl chloride, glutaryl chloride, sebacoyl chloride, the corresponding bromides, fluorides, iodides and the like, a dihydroxyl aromatic moiety such as methylhydroquinone and a branching or crosslinking triacid halide agent, such as trimesoyl chloride and the like in the presence of a base such as pyridine or triethylamine and a halogenated solvent such as dichloromethane. Alternatively, the random copolymer of FIG. 2 can be prepared from the melt polyesterification of an aromatic acid or ester such as terephthalic acid or dialkyl terephthalate and the like, three different spacers such as glutaryl, pimelic and sebacic acid, or dialkyl glutarate, dialkyl adipate and dialkyl sebacoate of the like with a substituted alkylhydroquinone such as methylhydroquinone and a crosslinker, such as trimesic acid or 2-hydroxyhydroquinone in the presence of a metal catalyst, such as magnanese acetate, vanadyl acetoacetate, antimony (III) butoxide, or di-n-butyltin dimethoxide, and mixtures thereof. Generally, the reaction for the preparation of the aforementioned liquid crystalline copolymers of the present invention by the solution condensation process is accomplished at a temperature of from about 10° to about 50° C. and preferably from about 15° to about 40° C. The melt polyesterfication reaction of the aforementioned thermotropic liquid crystalline copolymer is accomplished by heating the mixture from 100° to 250° C., and more preferably from 125° to 210° C., under high vacuum pressure of from about 1 to 0.0001 Torr and more preferably from 0.5 to 0.001 Torr during a period of 1 to 12 hours, and more preferably from 3 to 10 hours. During this latter process, reaction monomers and byproducts such as water or alcohols, such as methanol or ethanol, are removed.

In one specific embodiment, the copolyester as represented by FIGS. 1 and 2 can be prepared by reacting from about 0.8 mole to about 1 mole of p,p-di-(methylphenoxy)-terephthalate with from about 0.8 to about 1 mole of an aliphatic diacid chloride mixture containing at least two different spacers, such as adipoyl chloride, and the like as indicated herein in the presence of excess organic solvent such as dichloromethane at a temperature of about 15° to about 25° C. The reaction is generally affected in the presence of from about 1 mole to about 3 moles of an acid acceptor, such as triethylamine or pyridine, and the like, and an excess amount, that is an amount sufficient to dissolve the reactants in the organic solvent, such as aliphatic halogenated hydrocarbons including dichloromethane. Thereafter, the resulting product is separated from the reaction mixture by known techniques, such as extraction, precipitation, followed by filtration, optionally washed, and identified by various analytical tools including elemental analysis, NMR, IR and UV. In addition, the polymer products resulting possess intrinsic viscosities of from about 0.06 to about 1.0, and preferably from about 0.12 to about 0.8 deciliters per gram.

The aforementioned thermotropic liquid crystalline polymers are generally present in the toner composition in various effective amounts depending, for example, on the amount of the other components, and providing the objectives of the present invention are achievable. Generally, from about 50 to about 95 percent by weight of the polymer is present, and preferably from about 80 to about 90 percent by weight is selected.

Numerous well known suitable pigments or dyes can be selected as the colorant for the toner particles including, for example, carbon black, nigrosine dye, lamp black, iron oxides, magnetites, and mixtures thereof. The pigment, which is preferably carbon black, should be present in a sufficient amount to render the toner composition highly colored. Thus, the pigment particles are present in amounts of from about 1 percent by weight to about 25 percent by weight, and preferably from about 2 to about 15 weight percent based on the total weight of the toner composition, however, lesser or greater amounts of pigment particles can be selected providing the objectives of the present invention are achieved.

Various magnetites, which are comprised of a mixture of iron oxides ($FeO.Fe_2O_3$) including those commercially available, such as Mapico Black, can be selected for the toner compositions illustrated herein. The aforementioned magnetite particles are present in various effective amounts; generally, however, they are present in the toner composition in an amount of from about 10 percent by weight to about 30 percent by weight, and preferably in an amount of from about 16 percent by weight to about 19 percent by weight. Other magnetites not specifically disclosed herein may be selected provided the objectives of the present invention are achievable. Mixtures of magnetites and other pigments, such as carbon blacks, can be selected, which mixtures usually contain from about 2 to about 15 percent by weight of carbon black and from about 10 to about 40 percent by weight of magnetite providing the objectives of the present invention are achievable.

A number of different charge enhancing additives may be selected for the toner compositions of the present invention to assist in enabling these compositions to acquire a positive charge thereon of from, for example, about 10 to about 40 microcoulombs per gram. Examples of charge enhancing additives include alkyl pyridinium halides, especially cetyl pyridinium chloride, reference U.S. Pat. No. 4,298,672, the disclosure of which is totally incorporated herein by reference; organic sulfate or sulfonate compositions, reference U.S. Pat. No. 4,338,390, the disclosure of which is totally incorporated herein by reference; distearyl dimethyl ammonium methyl sulfate reference U.S. Pat. No. 4,560,635, the disclosure of which is totally incorporated herein by reference; and other similar known charge enhancing additives. Also, there may be selected charge enhancing additives that assist in imparting a negative charge to the toner particles including, for example, orthophenol carboxylic acid, TRH available from Hodogaya Chemical, and the like. These additives are usually incorporated into the toner in an amount of from about 0.1 percent by weight to about 15 percent by weight, and preferably these additives are present in an amount of from about 0.2 percent by weight to about 5 percent by weight.

Moreover, the toner composition can contain as internal, or preferably as external components, other additives such as colloidal silicas inclusive of Aerosil, metal salts of fatty acids such as zinc stearate, metal salts, reference U.S. Pat. Nos. 3,590,000 and 3,900,588, the disclosures of which are totally incorporated herein by reference, and waxy components, particularly those with a molecular weight of from about 1,000 to about 15,000, and preferably from about 1,000 to about 6,000, such as polyethylene and polypropylene. The additives are generally present in an amount of from about 0.1 to about 1 percent by weight, while the waxy components are usually present in effective amounts such as, for example, from about 1 to about 10 weight percent, and preferably from about 1 to about 5 weight percent. Other percentages of additives and waxy components not specifically mentioned herein may be selected providing the objectives of the present invention are accomplished.

The toner composition of the present invention can be prepared by a number of known methods including melt blending the thermotropic liquid polymers, and pigment particles or colorants, followed by mechanical attrition. Other methods include those well known in the art such as spray drying, melt dispersion, dispersion polymerization, extrusion, and suspension polymerization. Thereafter, the toner composition can be classified and fitted to provide toner particles with an average diameter of from about 5 to about 25, and preferably from about 10 to about 25 microns.

In one specific embodiment, the toner compositions of the present invention are prepared by initially grinding the thermotropic liquid crystalline particles with a particle size of less than 1,000 micrometers and more preferably less than 850 micrometers, and mixing 80 to 95 percent by weight of the resulting ground particles with 5 to 15 percent by weight of pigment such as Regal 330 ® carbon black and 0.5 to 1.5 percent of charge additives, such as distearyl diethyl ammonium methyl sulfate (DDAMS). The three component mixture can then be dry blended first on a paint shaker and then on a roll-mill. The mixture is then extruded using a counter-rotating twin screw extruder by melt mixing the mixture at a barrel temperature of from about 105° to 115° C. at a screw rotational speed of from about 50 to about 70 revolutions per minute and at a feed rate of from about 5 to about 15 grams per minute. The resulting extruded strands are then broken into coarse particles by fitzmilling twice; the first time to ground the toner particles to less than about 850 micrometers average diameter, and the second time to further micronize to yield toner particles with an average diameter of about 500 micrometers. After grinding, an 8 inch Sturtevant micronizer was used to reduce the particles further, after which the toner was classified in a Donaldson classifier to provide the final toner product, which had an average particle size diameter of from about 9.0 to 11.0 micrometers and a GSD of about 1.30.

Important characteristics associated with the toner compositions of the present invention are illustrated herein and include a melting temperature of from about 65° to about 110° C. in some embodiments, fusing temperatures of less than about 275° F., and a fusing temperature latitude of from about 30° to about 85° F. Moreover, it is believed that the aforementioned toners possess stable triboelectric charging values of from about 10 to about 40 microcoulombs per gram for an extended number of imaging cycles exceeding, for example, in some embodiments one million developed copies. Although it is not desired to be limited by theory, it is believed that two important factors for the slow, or substantially no degradation in the toner triboelectric charging values reside in the unique physical properties of the thermotropic liquid crystalline polymers selected, and moreover the stability of the carrier particles utilized. Also of importance is the consumption of less energy with the toner compositions of the present invention since they can be fused at a lower temperature, that is from about 225° F. to 275° F. (fuser roll set temperature) compared with conventional toners including those containing styrene butadiene resins which fuse at from about 300° to about 330° F. In addition, the thermotropic liquid crystalline polymers illustrated herein possess the other important characteristics mentioned herein inclusive of broader fusing latitudes of from about 30° to about 85° F. depending on the extent, that is the value of p, of crosslinking present in the liquid crystalline copolyester component of the toner. This fusing latitude is the temperature difference between the fixing temperature and the hot-offset temperature, that is the temperature at which the toner offsets on to the fuser roll which causes ghosting or background images on subsequent copies. It is also important to obtain a toner with a low fusing temperature of less than 275° F. as well as obtaining a toner with a broad fusing latitude of from about 50° to 125° F. and preferably from 75° F. Generally, the higher the content of branching and/or crosslinking present in the aforementioned copolyester, the higher said broad fusing latitude is observed. A comparative toner composition containing 89 percent by weight of the liquid crystalline copolyester as illustrated in FIG. 1 where no crosslinking agent is present, p is equal to 0, 1 percent of DDAMS (distearyl dimethyl ammonium methyl sulfate) and 10 percent Regal 330 ® by weight are present, yielded a narrow fusing latitude of 19° C. In contrast, with the toner of the present invention containing 89 percent of liquid crystalline copolyester as illustrated in FIG. 1 where the crosslinking agent trimisoyl chloride is present in an amount of 0.4 weight percent, that is p is equal to 0.4 and 0, 1 percent DDAMS as well as 10 percent Regal 330 ® by weight are present, yielded a higher fusing latitude of 31° C.

As carrier particles for enabling the formulation of developer compositions when admixed with the toner described herein, there are selected various known components including those wherein the carrier core is comprised of steel, nickel, magnetites, ferrites, copper zinc ferrites, iron, polymers, mixtures thereof, and the like. Also useful are the carrier particles prepared by a powder coating process as illustrated in U.S. Pat. Nos. 4,935,326 and 4,937,166, the disclosures of which are totally incorporated herein by reference. More specifically, these carrier particles can be prepared by mixing low density porous magnetic, or magnetically attractable metal core carrier particles with from, for example, between about 0.05 percent and about 3 percent by weight, based on the weight of the coated carrier particles, of a mixture of polymers until adherence thereof to the carrier core by mechanical impaction or electrostatic attraction; heating the mixture of carrier core particles and polymers to a temperature, for example, of between from about 200° F. to about 550° F. for a period of from about 10 minutes to about 60 minutes enabling the polymers to melt and fuse to the carrier core particles; cooling the coated carrier particles; and thereafter classifying the obtained carrier particles to a desired particle size. Various effective coating weights can be selected for the carrier particles. Generally, average coating weights of from 0.1 to about 10 percent and preferably from about 1 to about 5 percent are preferred. Furthermore, the coatings may be continuous or semicontinuous on the carrier core providing the objectives of the present invention are achievable.

In a specific embodiment of the present invention, there are provided carrier particles comprised of a core with a coating thereover comprised of a mixture of a first dry polymer component and a second dry polymer component. Therefore, the aforementioned carrier compositions can be comprised of known core materials including iron with a dry polymer coating mixture thereover. Subsequently, developer compositions of the present invention can be generated by admixing the aforementioned carrier particles with the toner compositions comprised of the crosslinked thermotropic resin particles illustrated herein and pigment particles.

Also encompassed within the scope of the present invention are colored developers comprised of toner compositions comprised of the thermotropic liquid crystalline polymers illustrated herein, carrier particles, and as pigments or colorants, red, blue, brown, magenta, cyan and/or yellow particles, as well as mixtures thereof. More specifically, illustrative examples of magenta materials that may be selected as pigments include 1,9-dimethyl-substituted quinacridone and anthraquinone dye identified in the Color Index as Cl 60720; Cl Dispersed Red 15, a diazo dye identified in the Color Index as Cl 26050; Cl Solvent Red 19; and the like. Examples of cyan materials that may be used as pigments include copper tetra-4(octadecyl sulfonamido) phthalocyanine; X-copper phthalocyanine pigment listed in the Color Index as Cl 74160; Cl Pigment Blue; and Anthrathrene Blue, identified in the Color Index as Cl 69810; Special Blue X-2137; and the like; while illustrative examples of yellow pigments that may be selected are diarylide yellow 3,3-dichlorobenzidene acetoacetanilides, a monoazo pigment identified in the Color Index as Cl 12700; Cl Solvent Yellow 16, a nitrophenyl amine sulfonamide identified in the Color Index as Foron Yellow SE/GLN; Cl Dispersed Yellow 33, a 2,5-dimethoxy-4-sulfonanilide phenylazo-4'-chloro-2,5-dimethoxy acetoacetanilide; Permanent Yellow FGL; and the like. These pigments are generally present in the toner composition in an amount of from about 1 weight percent to about 15 weight percent based on the weight of the toner resin particles.

The toner and developer compositions of the present invention may be selected for use in electrophotographic imaging processes containing therein conventional photoreceptors, including inorganic and organic photoreceptor imaging members. Examples of imaging members are selenium, selenium alloys, and selenium or selenium alloys containing therein additives or dopants, such as halogens in an amount, for example, of from about 200 to about 500 parts per million. Furthermore, there may be selected organic photoreceptors, illustrative examples of which include layered photoresponsive devices comprised of transport layers and photogenerating layers, reference U.S. Pat. No. 4,265,990, the disclosure of which is totally incorporated herein by reference, and other similar layered photoresponsive devices. Examples of generating layers are trigonal selenium, metal phthalocyanines, metal free phthalocyanines and vanadyl phthalocyanines. As charge transport molecules there can be selected the aryl amines disclosed in the '990 patent. Also, there can be selected as photogenerating pigments, squaraine compounds, azo pigments, perylenes, thiapyrillium materials, and the like. These layered members are conventionally charged negatively, thus usually a positively charged toner is selected for development. Moreover, the developer compositions of the present invention are particularly useful in electrophotographic imaging processes and apparatuses wherein there is selected a moving transporting means and a moving charging means, and wherein there is selected a deflected flexible layered imaging member, reference U.S. Pat. Nos. 4,394,429 and 4,368,970, the disclosures of which are totally incorporated herein by reference. Images obtained with the developer compositions of the present invention possess acceptable solids, excellent halftones and desirable line resolution with acceptable or substantially no background deposits.

The aforementioned imaging methods are well known, and generally include the formation of an image, preferably an electrostatic latent image on a photoconductive imaging member, thereafter developing this image with the toner and developer compositions of the present invention, subsequently transferring the developed image to a suitable substrate such as paper, and permanently affixing the image thereto by fusing with, for example, heat or other similar fusing processes.

The following examples are being supplied to further define the present invention, it being noted that these examples are intended to illustrate and not limit the scope of the present invention. Parts and percentages are by weight unless otherwise indicated.

EXAMPLE I (No Crosslinking Component)

To a mixture of p,p-di(methylphenoxy)-terephthalate (0.1 mole), pyridine (0.3 mole) and dichloromethane was added dropwise with a syringe pump a mixture of 3-methyladipoyl dichloride (0.0333 mole), pimeloyl dichloride (0.0333 mole), and sebacoyl dichloride (0.0333 mole). The mixture was then left undisturbed overnight, about 16 hours, and then neutralized with dilute aqueous HCl. The resulting organic portion was then separated, washed with water followed by brine, and then precipitated in methanol. The copolyester product was then filtered off and dried to provide a yield in excess of 95 percent. There was obtained as evidenced by nuclear magnetic resonance and infrared spectroscopy, the random copolyester product as illustrated in FIG. 1, where m, n and o represent repeating segments and are about 33.33 percent each, p=0 percent (no crosslinking agent present), and x, y, and z are as recited in Example II.

The DSC thermogram of this polymer indicated a glass transition of about 40° C. to about 42° C., a melting point transition from the crystalline solid state to the liquid crystalline of from about 60° C. to 75° C., and a clearing point transition from the liquid crystalline state to the isotropic melt of about 330° C. The intrinsic viscosity of this polymer was 0.170 dl/gram using methylene chloride as the solvent, and the weight average molecular weight of the polymer product was 5,000 as determined by GPC. The TMA indicated a softening point of 61° C. at 50 percent penetration using a 10 gram weight. Rheological measurements revealed that the melt viscosity of the obtained polymer product decreased from an initial viscosity of $7.5 \times 10^4$ poise at 64° C. to about $3.5 \times 10^3$ poise at 76° C. The Shimadzu flowtester CFT-500D evidenced a polymer softening point 60.3° C., and initiation of flow temperature at 70.4° C. at a 10 Kgf load with a dye orifice diameter of 1 millimeter, and at a constant temperature rate of 10° C. per minute.

EXAMPLE II

To a mixture of p,p-di(methylphenoxy)-terephthalate (0.1 mole), pyridine (0.3 mole) and dichloromethane was added dropwise with a syringe pump a mixture of 3-methyl adipoyl dichloride (0.0333 mole), pimeloyl dichloride (0.0333 mole), and sebacoyl dichloride (0.0333 mole) and as the crosslinker trimesoyl chloride (0.0001 mole). The mixture was then left undisturbed overnight, about 16 hours, and then neutralized with dilute aqueous HCl. The resulting organic portion was then separated, washed with water followed by brine, and then precipitated in methanol. The copolyester product was then filtered off and dried to provide a yield in excess of 95 percent. There was obtained as evidence by nuclear magnetic resonance and infrared spectroscopy the random copolyester product as illustrated in FIG. 1, where m, n, and o represent repeating segments 33.3 weight percent each, p is equal to 0.1 percent (0.1 percent crosslinking agent present), x is the 3-methyl adipoyl spacer, y is the pimeloyl spacer, and z is the sebacoyl spacer.

The DSC thermogram of this polymer indicated a glass transition of about 41° C. to about 44° C., a melting point transition from the crystalline solid state to the liquid crystalline of from about 60° C. to 80° C., and a clearing point transition from the liquid crystalline state to the isotropic melt of from about 300° C. to about 325° C. The intrinsic viscosity of this polymer was 0.240 dl/gram using methylene chloride as the solvent, and the weight average molecular weight of the polymer product was 7,800 as determined by GPC. The TMA indicated a softening point of 66° C. at 50 percent penetration using a 10 gram weight. Rheological measurements revealed that the melt viscosity of the obtained polymer product decreased from an initial viscosity of $7.5 \times 10^4$ poise at 84° C. to about $3.5 \times 10^3$ poise at 97° C.

EXAMPLE III

To a mixture of p,p-di(methylphenoxy)-terephthalate (0.1 mole), pyridine (0.3 mole) and dichloromethane was added dropwise with a syringe pump a mixture of 3-methyl adipoyl dichloride (0.03327 mole), pimeloyl dichloride (0.03327 mole), and sebacoyl dichloride (0.03327 mole) and trimesoyl chloride crosslinker (0.0002 mole). The mixture was then left undisturbed overnight, about 16 hours, and then neutralized with dilute aqueous HCl. The resulting organic portion was then separated, washed with water followed by brine, and then precipitated in methanol. The copolyester product was then filtered off and dried to provide a yield in excess of 95 percent. There was obtained as evidence by nuclear magnetic resonance and infrared spectroscopy, the random copolyester product as illustrated in FIG. 1, where m, n, and o represent repeating segments of about 33.27 weight percent each, p is equal to 0.2 percent (0.2 percent crosslinking agent present), x is the 3-methyl adipoyl spacer, y is the primeloyl spacer, and z is the sebacoyl spacer.

The DSC thermogram of this polymer indicated a glass transition of about 43° C. to about 47° C., a melting point transition from the crystalline solid state to the liquid crystalline of from about 63° C. to 82° C., and a clearing point transition from the liquid crystalline state to the isotropic melt of from about 290° C. to about 325° C. The intrinsic viscosity of this polymer was 0.307 dl/gram using methylene chloride as the solvent, and the weight average molecular weight of the polymer product was 18,000 as determined by GPC. The TMA indicated a softening point of 67° C. at 50 percent penetration using a 10 gram weight. Rheological measurements revealed that the melt viscosity of the obtained polymer product decreased from an initial viscosity of $7.5 \times 10^4$ poise at 86° C. to about $3.5 \times 10^3$ poise at 103° C.

EXAMPLE IV

To a mixture of p,p-di(methylphenoxy)-terephthalate (0.1 mole), pyridine (0.3 mole) and dichloromethane was added dropwise with a syringe pump a mixture of 3-methyl adipoyl dichloride (0.03323 mole), pimeloyl dichloride (0.03323 mole), and sebacoyl dichloride (0.03323 mole), and trimesoyl chloride crosslinker (0.0003 mole). The mixture was then left undisturbed overnight, about 16 hours, and then neutralized with dilute aqueous HCl. The resulting organic portion was then separated, washed with water followed by brine, and then precipitated in methanol. The copolyester product was then filtered off and dried to provide a yield in excess of 95 percent. There was obtained as evidence by nuclear magnetic resonance and infrared spectroscopy, the random copolyester product as illustrated in FIG. 1, where m, n, and o represent repeating segments and are about 33.23 percent each, p is equal to 0.3 percent (0.3 percent crosslinking agent present), x is the 3-methyl adipoyl spacer, y is the pimeloyl spacer, and z is the sebacoyl spacer.

The DSC thermogram of this polymer indicated a glass transition of about 47° C. to about 49° C., a melting point transition from the crystalline solid state to the liquid crystalline of from about 68° C. to about 85° C., and a clearing point transition from the liquid crystalline state to the isotropic melt of from about 290° C. to about 320° C. The intrinsic viscosity of this polymer was 0.320 dl/gram using methylene chloride as the solvent, and the weight average molecular weight of the polymer product was 23,500 as determined by GPC. The TMA indicated a softening point of 70° C. at 50 percent penetration using a 10 gram weight. Rheological measurements revealed that the melt viscosity of the obtained polymer product decreased from an initial viscosity of $7.5 \times 10^4$ poise at 88° C. to about $3.5 \times 10^3$ poise at 107° C.

EXAMPLE V

To a mixture of p,p-di(methylphenoxy)-terephthalate (0.1 mole), pyridine (0.3 mole) and dichloromethane was added dropwise with a syringe pump a mixture of 3-methyl adipoyl dichloride (0.0332 mole), pimeloyl dichloride (0.0332 mole), and sebacoyl dichloride (0.0332 mole), and trimesoyl chloride crosslinker (0.0004 mole). The mixture was then left undisturbed overnight, about 16 hours, and then neutralized with dilute aqueous HCl. The resulting organic portion was then separated, washed with water followed by brine, and then precipitated in methanol. The copolyester product was then filtered off and dried to provide a yield in excess of 95 percent. There was obtained as evidence by nuclear magnetic resonance and infrared spectroscopy, the random copolyester product as illustrated in FIG. 1, where m, n, and o represent repeating segments and are about 33.2 percent each, p is equal to 0.4 percent (0.4 percent crosslinking agent present), x is the 3-methyl adipoyl spacer, y is the pineloyl spacer, and z is the sebacoyl spacer.

The DSC thermogram of this polymer indicated a glass transition of about 48° C. to about 52° C., a melting point transition from the crystalline solid state to the liquid crystalline of from about 70° C. to about 90° C., and a clearing point transition from the liquid crystalline state to the isotropic melt of from about 285° C. to about 305° C. The intrinsic viscosity of this polymer was 0.390 dl/gram using methylene chloride as the solvent, and the weight average molecular weight of the polymer product was 32,000 as determined by GPC. The TMA indicated a softening point of 74° C. at 50 percent penetration using a 10 gram weight. Rheological measurements revealed that the melt viscosity of the obtained polymer product decreased from an initial viscosity of $7.5 \times 10^4$ poise at 97° C. to about $3.5 \times 10^3$ poise at 116° C.

EXAMPLE VI

To a mixture of p,p-di(methylphenoxy)-terephthalate (0.1 mole), pyridine (0.3 mole) and dichloromethane was added dropwise with a syringe pump a mixture of 3-methyl adipoyl dichloride (0.03317 mole), pimeloyl dichloride (0.03317 mole), and sebacoyl dichloride (0.03317 mole), and trimesoyl chloride crosslinker (0.0005 mole). The mixture was then left undisturbed overnight, about 16 hours, and then neutralized with dilute aqueous HCl. The resulting organic portion was then separated, washed with water followed by brine, and then precipitated in methanol. The copolyester product was then filtered off and dried to provide a yield in excess of 95 percent. There was obtained as evidence by nuclear magnetic resonance and infrared spectroscopy, the random copolyester product as illustrated in FIG. 1, where m, n, and o represent repeating segments and are 33.17 percent each, p is equal to 0.5 percent (0.1 percent crosslinking agent present), x is the 3-methyl adipoyl spacer, y is the pimeloyl spacer, and z is the sebacoyl spacer.

The DSC thermogram of this polymer indicated a glass transition of about 49° C. to about 52° C., a melting point transition from the crystalline solid state to the liquid crystalline of from about 60° C. to about 85° C., and a clearing point transition from the liquid crystalline state to the isotropic melt of from about 275° C. to about 295° C. The intrinsic viscosity of this polymer was 0.420 dl/gram using methylene chloride as the solvent, and the weight average molecular weight of the polymer product was 42,000 as determined by GPC. The TMA indicated a softening point of 83° C. at 50 percent penetration using a 10 gram weight. Rheological measurements revealed that the melt viscosity of the obtained polymer product decreased from an initial viscosity of $7.5 \times 10^4$ poise at 95° C. to about $3.5 \times 10^3$ poise at 124° C.

EXAMPLE VII

To a mixture of terephthaloyl dichloride (0.1 mole), pyridine (0.3 mole) and dichloromethane were added dropwise with a syringe pump a mixture of methyl hydroquinone (0.2 mole) followed by a mixture of 3-methyladipoyl dichloride (0.033 mole), pimeloyl dichloride (0.033 mole), and sebacoyl dichloride (0.033 mole), and trimesoyl chloride crosslinker (0.0005 mole) over a two hour period. The mixture was then left undisturbed overnight, about 16 hours, and then neutralized with dilute aqueous HCl. The resulting organic portion was then separated, washed with water followed by brine, and then precipitated in methanol. The copolyester product was then filtered off and dried to provide a yield in excess of 95 percent. There was obtained as evidence by nuclear magnetic resonance and infrared spectroscopy, the random copolyester product as illustrated in FIG. 2, where l, m, n and o represent repeating segments, specifically l is about 50 percent, m is about 16.1 percent, n is about 16.1 percent and o is about 16.1 percent, p is equal to 0.5 percent (0.5 percent crosslinking agent present), x is the 3-methyl adipoyl spacer, y is the pimeloyl spacer, and z is the sebacoyl spacer.

The DSC thermogram of this polymer indicated a glass transition of about 46° C. to about 48° C., a melting point transition from the crystalline solid state to the liquid crystalline of from about 70° C. to about 90° C., and a clearing point transition from the liquid crystalline state to the isotropic melt of from about 250° C. to about 275° C. The intrinsic viscosity of this polymer was 0.445 dl/gram using methylene chloride as the solvent, and the weight average molecular weight of the polymer product was 30,600 as determined by GPC. The TMA indicated a softening point of 75° C. at 50 percent penetration using a 10 gram weight. Rheological measurements revealed that the melt viscosity of the obtained polymer product decreased from an initial viscosity of $7.5 \times 10^4$ poise at 101° C. to about $3.5 \times 10^3$ poise at 119° C.

EXAMPLE VIII

Toner (Comparitive—No Crosslinker)

To a mixture of p,p-di(methylphenoxy)-terephthalate (1 mole), pyridine (3 moles) and dichloromethane was added dropwise with a syringe pump a mixture of 3-methyl adipoyl dichloride (0.333 mole), pimeloyl dichloride (0.333 mole), and sebacoyl dichloride (0.333 mole). The mixture was then left undisturbed overnight, about 16 hours, and then neutralized with dilute aqueous HCl. The resulting organic portion was then separated, washed with water followed by brine, and then precipitated in methanol. The copolyester product was then filtered off and dried to provide a yield in excess of 95 percent. There was obtained as evidence by nuclear magnetic resonance and infrared spectroscopy, the random copolyester product as illustrated in FIG. 1, where m, n, and o represent repeating segments and are about 33.33 percent each, p is equal to 0 (no crosslinking present), x is the 3-methyl adipoyl spacer, y is the pimeloyl spacer, and z is the sebacoyl spacer.

The DSC thermogram of this polymer indicated a glass transition of about 43° C. to about 48° C., a melting point transition from the crystalline solid state to the liquid crystalline of from about 60° C. to about 85° C., and a clearing point transition from the liquid crystalline state to the isotropic melt of about 295° C. The intrinsic viscosity of this polymer was 0.345 dl/gram using methylene chloride as the solvent, and weight average molecular weight of the polymer product was 18,200 as determined by GPC. The TMA indicated a softening point of 65° C. at 50 percent penetration using a 10 gram weight. Rheological measurements revealed that the melt viscosity of the obtained polymer product decreased from an initial viscosity of $7.5 \times 10^4$ poise at 85° C. to about $3.5 \times 10^3$ poise at 108° C.

The above liquid crystalline copolyester product was in the form of large chunks. The polymer was ground to smaller particles in a Model J Fitzmill equipped with an 850 micrometer screen. After grinding, 445 grams (89 percent) of polymer were mixed with 50 grams (10 percent) of Regal 330 ® and 5 grams (1 percent) of the charge additive distearyl dimethyl ammonium methyl sulfate. The three component mixture was dry blended first on a paint shaker and then on a roll mill. A small DAVO ™ counter-rotating twin screw extruder was then used to melt mix the aforementioned triblend polymer/additives mixture. A K-Tron twin screw volumetric feeder was used to feed the mixture to the extruder which exhibited a barrel temperature of 110° C. (flat temperature profile), screw rotational speed of 60 rpm, and at a feed rate of 10 grams/minute. The resulting material was then processed to make the final toner product as follows. The extruded strands were broken into coarse particles by passing through a Model J. Fitzmill twice, the first time with an 850 micrometer screen, and the second time with a 425 micrometer screen. The 8-inch Sturtevant micronizer was used to reduce the particle size further. After grinding, the toner was further classified in a Donaldson classifier. The final toner product, 89 percent polymer, 1 percent DDAMS, and 10 percent carbon black had an average particle size, $D_{50}$, of about 9.0 micrometers and a GSD of about 1.3.

The Shimadzu flowtester CFT-500D showed a glass transition of 48° C., a softening point of 67° C., and beginning of flow temperature at 79° C. using a 10 Kg (killigram) load, 1 millimeter orifice dye diameter, and at a constant temperature rate of 10° C. per minute for the above toner product.

A developer composition was prepared by roll milling the above prepared toner, 3.5 parts by weight with 100 parts by weight of a carrier comprised of a steel core with a polyvinylidene polymer coating thereover, 1.25 percent coating weight, for 1 hour (Toner Concentration=3.5 percent). Unfused copies were then produced on 4024 paper using a Xerox Corporation 1075 TM imaging apparatus with the fusing system disabled. There resulted images of excellent quality with no background deposits and high resolution for an extended number of imaging cycles. These copies were subsequently fused on a customized fusing rig comprised of a 3 inch diameter silicone rubber fusing roller and a 2.5 inch diameter pressure roller using a process speed of 11.9 inches per second. The tribo data was obtained using the known blow-off Faraday Cage apparatus. Fifty gram batches of the developer were roll milled for one hour, and one gram of the charged developer was weighed into the blow-off cage. The toner was blown away from the carrier a minimum of six times under dry $N_2$, until the difference between the last two electrometer readings was less than 2 percent. The electrometer measures the residual charge on the cage, which is of equal charge and opposite sign to that of the toner that was blown off. The tribo charge of the toner after the paint shaking was 12.7 microcoulombs per gram and 20.9 microcoulombs per gram after roll milling against the aforementioned carrier. Fusing evaluation of the toner resulting indicated a minimum fixing temperature of 102° C. and hot-offset temperature of about 120° C., hence a narrow fusing latitude of about 18° C. Furthermore, the images fused between 102° C. and 120° C. were of excellent quality with no background deposits.

EXAMPLE IX

To a mixture of p,p-di(methylphenoxy)-terephthalate (1 mole), pyridine (3 moles) and dichloromethane was added dropwise with a syringe pump a mixture of 3-methyl adipoyl dichloride (0.332 mole), pimeloyl dichloride (0.332 mole), sebacoyl dichloride (0.332 mole), and 0.0004 mole of trimesoyl chloride crosslinker. The resulting mixture was then left undisturbed overnight, about 16 hours, and then neutralized with dilute aqueous HCl. The resulting organic portion was then separated, washed with water followed by brine, and then precipitated in methanol. The copolyester product was then filtered off and dried to provide a yield in excess of 95 percent. There was obtained as evidence by nuclear magnetic resonance and infrared spectroscopy, the random copolyester product as illustrated in FIG. 1, where m, n, and o represent repeating segments and are about 33.2 percent each, p is equal to 0.4 percent (0.4 percent crosslinking agent present), x is the 3-methyl adipoyl spacer, y is the pimeloyl spacer, and z is the sebacoyl spacer; that is the polymer of Example V.

The DSC thermogram of this polymer indicated a glass transition of about 48° C. to about 52° C., a melting point transition from the crystalline solid state to the liquid crystalline of from about 70° C. to from 90° C., and a clearing point transition from the liquid crystalline state to the isotropic melt of from about 285° C. to about 305° C. The intrinsic viscosity of this polymer was 0.390 dl/gram using methylene chloride as the solvent, and the weight average molecular weight of the polymer product was as determined by GPC. The TMA indicated a softening point of 74° C. at 50 percent penetration using a 10 gram weight. Rheological measurements revealed that the melt viscosity of the obtained polymer product decreased from an initial viscosity of $7.5 \times 10^4$ poise at 97° C. to about $3.5 \times 10^3$ poise at 116° C. A weight average molecular weight of 32,000 (determined by GPC) was obtained for this copolyester using tetrahydrofuran as the solvent. The Shimadzu flowtester CFT-500D evidenced for the above product polymer a softening point of 75.6° C., and initiation of flow temperature at 87.8° C., using a 10 Kg load, 1 millimeter orifice diameter and at a constant temperature rate of 10° C. per minute.

The above liquid crystalline copolyester product was in the form of large chunks. The resulting polymer was ground to smaller particles in a Model J. Fitzmill equipped with an 850 micrometer screen. After grinding, 445 grams (89 percent) of polymer were mixed with 50 grams (10 percent) of Regal 330 ® and 5 grams (1 percent) of distearyl dimethyl ammonium methyl sulfate. The three component mixture was dry blended first on a paint shaker and then on a roll mill. A small DAVO TM counter-rotating twin screw extruder was then used to melt mix the aforementioned triblend polymer/additive mixture. A K-Tron twin screw volumetric feeder was used to feed the mixture to the extruder with a barrel temperature of 110° C. (flat temperature profile), screw rotational speed of 60 rpm and at a feed rate of 10 grams/minute. The extruded strands were broken into coarse particles by passing through a Model J. Fitzmill twice, the first time with an 850 micrometer screen, and the second time with a 425 micrometer screen. An 8-inch Sturtevant micronizer was used to reduce the particle size further. After grinding, the toner was further classified in a Donaldson classifier. The final toner product, 89 percent polymer, 10 percent carbon black, 1 percent DDAMS had a $D_{50}$ of about 9.0 micrometers and a GSD of about 1.3.

The Shimadzu flowtester CFT-500D showed a glass transition of 52° C., a softening point of 73° C., and beginning of flow temperature at 92.2° C. using a 10 Kg load, 1 millimeter dye orifice diameter, and at a constant temperature rate of 10° C. per minute for the above toner product.

A developer composition was prepared by repeating the procedure of Example VIII. Unfused copies were then produced on one side of 4024 paper using a Xerox Corporation 1075 TM imaging apparatus with the fusing system disabled. These copies were subsequently fused on a customized fusing rig of a 3 inch diameter silicone rubber fuser roll and a 2.5 inch diameter pressure roll using a process speed of 11.9 inches per second. The tribo data was obtained using the known Faraday Cage Blow-Off Apparatus. Fifty gram batches of the above developer was roll milled for one hour, and one gram of the charged developer was weighed into a Faraday Blow-off Cage. The toner was blown away from the carrier a minimum of six times under dry $N_2$ until the difference between the last two electrometer readings was less than 2 percent. The electrometer measures the residual charge on the cage, which is of equal charge and opposite sign to that of the toner that was blown off. The tribo charge of the toner after the paint shaking was 16.5 microcoulombs per gram and 21.5 microcoulombs per gram after roll milling against the aforementioned carrier. Fusing evaluation of this toner resulted with a minimum fixing temperature of 129° C. and Hot-Offset temperature of about 160° C., hence a broader fusing latitude of about 31° C. than the toner of Example VIII. Furthermore, the images fused between 129° C. and 160° C. were of excellent quality with no background deposits.

With regard to the above Examples, the sum of l, m, n, o, and p is equal to 100 percent.

Other modifications of the present invention may occur to those skilled in the art subsequent to a review of the present application. The aforementioned modifications, including equivalents thereof, are intended to be included within the scope of the present invention.

What is claimed is:

1. A crosslinked thermotropic liquid crystalline polymer containing a number of reoccurring units and which polymer is represented by the following formulas:

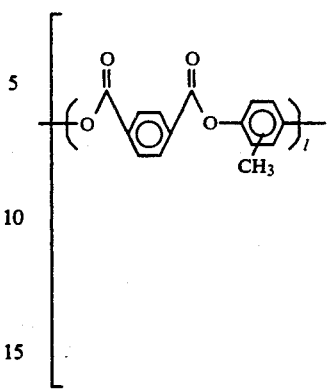

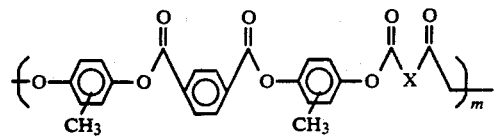

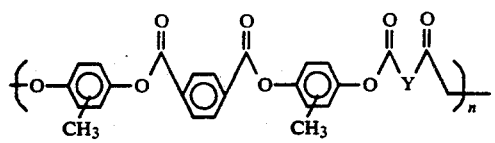

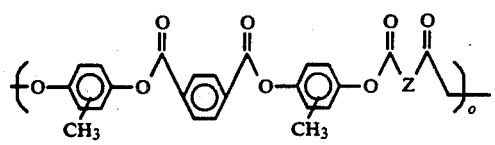

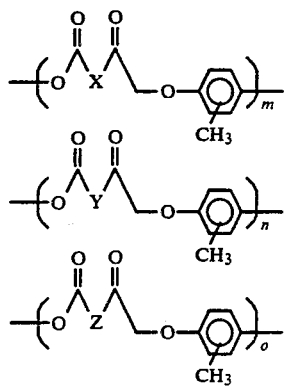

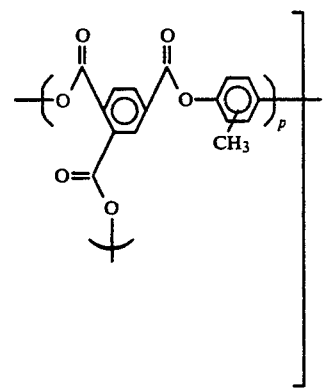

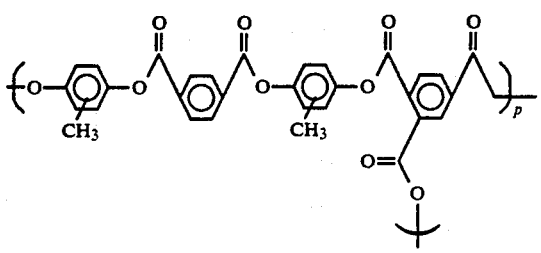

wherein x, y, and z are independently selected from the group consisting of alkyl, substituted alkyl, alkylene, and substituted alkylene, wherein l, m, n, and o represent the number of monomer segments present; p represents the amount of crosslinking component present; x, y, and z are independently selected from the group consisting of alkyl, substituted alkyl, alkylene, and substituted alkylene; and wherein the sum of l, m, n, o, and p is equal to 100.

2. A thermotropic liquid crystalline random polymer in accordance with claim 1 wherein l, m, n, and o are from about 1 to 99 percent and p is from about 0.05 to 5 percent providing that the sum thereof is equal to 100 percent.

3. A thermotropic liquid crystalline random polymer in accordance with claim 1 wherein m, n, and o are 33.2 percent and p is 0.4 percent.

4. A thermotropic liquid crystalline random polymer in accordance with claim 1 wherein l is 50 percent, m, n, and o are 16.1 percent and p is 0.5 percent.

5. A thermotropic liquid crystalline random polymer in accordance with claim 1 wherein the alkylene groups x, y and z contain from about 1 to 25 carbon atoms.

6. A thermotropic liquid crystalline polymer in accordance with claim 1 wherein the polymer is crosslinked with a trivalent acid.

7. A thermotropic liquid crystalline polymer in accordance with claim 1 wherein the polymer is crosslinked with an acid halide.

8. A crosslinked thermotropic liquid crystalline polymer in accordance with claim 6 wherein the acid is selected from the group consisting of trimesic, beta-methyl tricarballic, benzene tricarboxylic, and n-naphthalene tricarboxylic.

9. A crosslinked thermotropic liquid crystalline polymer in accordance with claim 8 wherein the acid halide is trimesoyl chloride.

10. A crosslinked thermotropic liquid crystalline polymer in accordance with claim 1 wherein alkyl contains from 1 to about 25 carbon atoms.

11. A crosslinked thermotropic liquid crystalline polymer in accordance with claim 1 wherein alkyl contains from 1 to about 10 carbon atoms.

12. A crosslinked thermotropic liquid crystalline polymer in accordance with claim 1 wherein alkylene contains from 1 to about 25 carbon atoms.

13. A crosslinked thermotropic liquid crystalline polymer in accordance with claim 1 wherein alkylene contains from 1 to about 10 carbon atoms.

14. A crosslinked thermotropic liquid crystalline polymer in accordance with claim 1 wherein alkyl is selected from the group consisting of methyl, ethyl, propyl, butyl, hexyl, and octyl.

15. A crosslinked thermotropic liquid crystalline polymer in accordance with claim 1 wherein alkylene is selected from the group consisting of methylene, ethylene, propylene, butylene, hexylene, and octylene.

16. A thermotropic liquid crystalline polymer in accordance with claim 1 wherein the weight average molecular weight thereof is from about 10,000 to about 150,000.

17. A thermotropic liquid crystalline polymer in accordance with claim 1 wherein the weight average molecular weight thereof is from about 109,000 to about 75,000.

18. A branched liquid crystalline random copolymer of the following formula

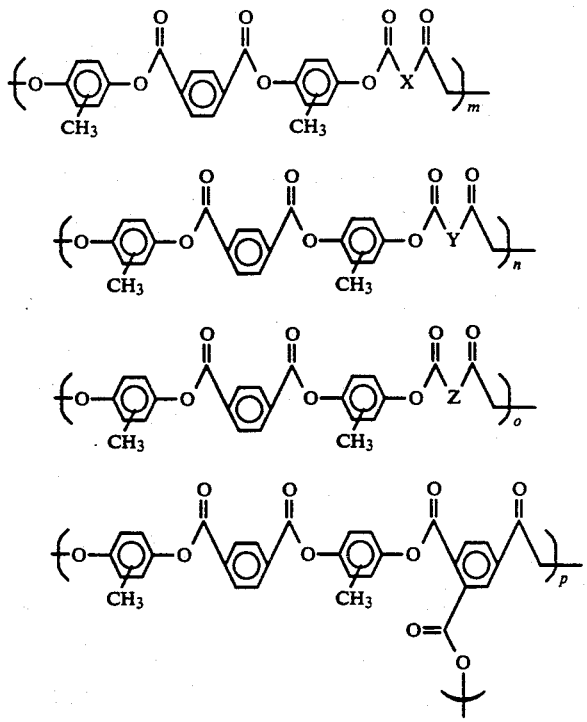

wherein x, y, and z are independently selected from alkyl and alkylene subject to the provision that x, y, and z represent different groups; l, m, n, and o represent the number of monomer segments present in the polymer; and p represents the percentage or amount of crosslinking segment with the provision that the numerical sum of l, m, n, o, and p is equal to 100.

19. A branched liquid crystalline random copolymer of the following formula

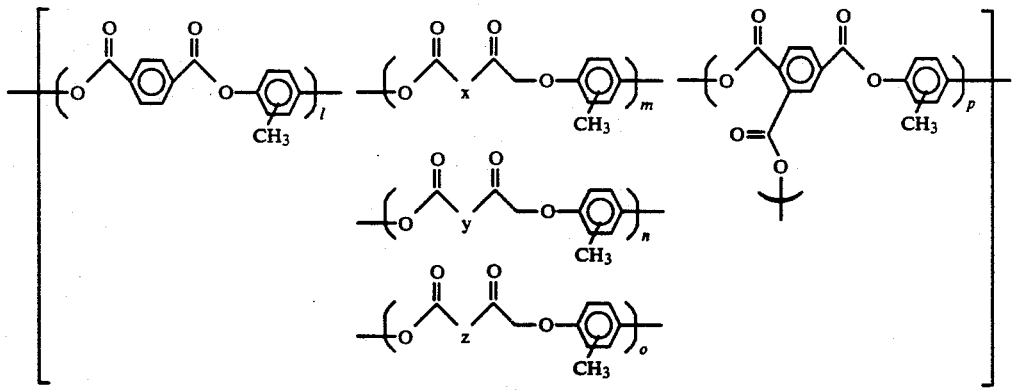

wherein x, y, and z are independently selected from alkyl and alkylene subject to the provision that x, y, and z represent different groups; l, m, n, and o represent the number of monomer segments present in the polymer; and p represents the percentage or amount of crosslinking segment with the provision that the numerical sum of l, m, n, o, and p is equal to 100.

* * * * *